July 15, 1941.   H. P. PHILLIPS   2,249,256

PISTON INNER RING OR EXPANDER

Filed Aug. 5, 1939

INVENTOR.
Harold P. Phillips
BY Earl & Chappell
ATTORNEYS

Patented July 15, 1941

2,249,256

UNITED STATES PATENT OFFICE 2,249,256

PISTON INNER RING OR EXPANDER

Harold P. Phillips, Hastings, Mich., assignor to Hastings Manufacturing Company, Hastings, Mich., a corporation of Michigan Application August 5, 1939, Serial No. 288,555

2 Claims. (Cl. 309—43)

The main objects of my invention are:

First, to provide an inner expanding ring or spring for a piston ring having novel provisions for equalizing the expansive action exerted thereby on the piston ring.

Second, to provide a piston ring expanding spring of the split type for having provision for offsetting the loss in tension therein usually caused by the split thereof.

Third, to provide a piston ring expanding spring of the type described having provisions for facilitating the positioning thereover of a piston ring when the inner spring is inserted in a piston groove.

Further objects relating to details and economies of my invention will definitely appear from the description to follow. The invention is defined in the claims.

A structure embodying the features of my invention is illustrated in the accompanying drawing, wherein.

Figure 1:
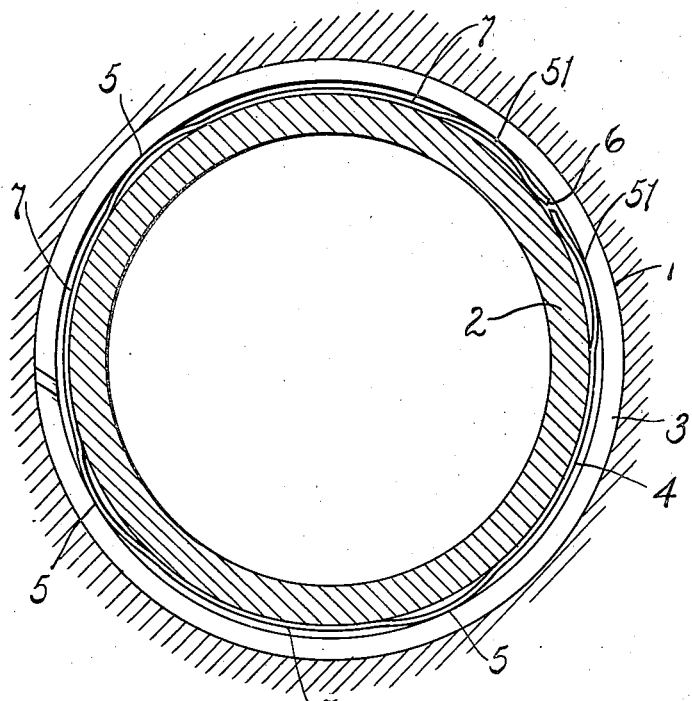
Fig. 1 is a fragmentary plan view in horizontal section illustrating a piston and cylinder with a piston ring and the improved expanding spring in accordance with my invention in operative relation to the piston.

In checking the wall tension characteristics of a conventional crimped steel inner expanding spring for piston rings having the usual gap or joint to permit its mounting on a piston, I have found that at an area near the joint, i. e., adjacent the ends of the spring, the tension exerted thereby on the piston ring is substantially less than that present at any other point around the circumference of the spring. This decrease in tension in the average crimped inner ring amounts to between 30% and 60%, averaging approximately 50%. The result is an unbalanced tension characterizing the piston ring, with attendant poor scraping action and excessive localized wear. The present invention relates to means for eliminating this drop in tension whereby the spring exerts uniform expansive action on the piston ring throughout its periphery. Another aspect of my invention lies in provision for facilitating installation of the outer piston ring over the expanding spring, as will be described.

Referring to the drawing, the reference numeral 1 indicates a cylinder having a piston 2 reciprocable therein, the piston carrying the usual piston ring 3. An inner expanding spring for this ring is generally indicated by the reference numeral 4, this spring being formed of thin ribbon steel disposed on edge vertically in the piston groove and in accordance with the usual practice provided with a plurality of crimps 5 engageable with the piston ring 3 to exert radial expansive action or tension thereon.

Figure 2:
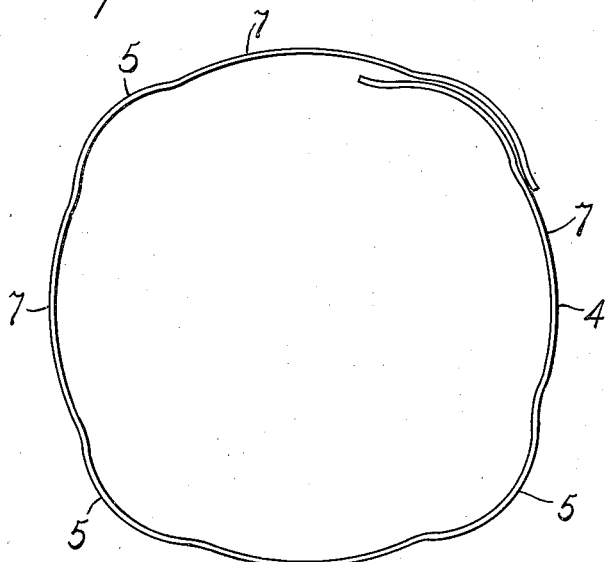
Fig. 2 is a plan view illustrating details of construction of the novel expander in according to my invention.

In order to equalize the tension exerted by the spring 4 and to eliminate the drop in tension ordinarily present adjacent the gap 6 in an inner spring of this type, I position the crimps so that those adjacent the gap and particularly designated 5I are closer to each other in installed position of the spring than any of the other crimps around the circumference of the inner ring. The result of this is that additional tension is built up adjacent the gap to offset the loss of tension because of the split of the inner ring. Of course, the exact positioning of the crimps 5I may be varied somewhat with relation to one another and to the gap, and the present invention is not particularly concerned with exact dimensions or positioning of the crimps, however it is concerned distinctly with the positioning of these crimps so as to effect the aforesaid compensation or equalization in tension and the concrete embodiment for attaining this result involves a closer spacing of the crimps 5I than the spacing of any other pair of adjacent crimps 5. In Fig. 2, the relaxed spring is shown prior to installation, with end crimps 5I nesting, it being observed that in this portion the five crimped spring has a generally rectangular outline.

The invention also deals with the concept of facilitating the installation of the piston ring 3 over the spring 4 when the latter is in the groove on the piston. In the usual crimped inner spring, the crimps 5 thereof are connected by intermediate, straight sections so that unless a large number of crimps are provided these crimps project beyond the groove of the piston to such an extent that it is difficult, if not impossible, to instal the outer piston ring 3 over the spring. To eliminate this objection, in most instances the inner expanding spring is provided with six, seven, or even eight crimps in the popular size range, i. e., in diameters between 3 inches and 3½ inches, the reason that a less number of crimps has not been used being the aforesaid difficulty of installation of the piston ring. For example, in a five crimp inner ring having straight connecting sections between the bends or crimps, the latter project out of the groove nearly a quarter inch in each crimp.

It is desirable to employ a five crimp inner ring or spring in preference to a ring having a greater number of crimps in order to lower the tension of the ring without reducing the thickness of the material, since reduction of the thickness of the material quickly reduces the wear life of the inner spring. In order to accomplish this, I form the intermediate reaches 7 of the ring connecting the crimps 5 thereof in a curved or generally circular outline but of materially greater radius of curvature than the crimps, so that in installed position it fits more readily around the bottom of the groove, as illustrated in Fig. 1, and accordingly reduces the extent to which the crimps 5 project in the groove.

The aforesaid intermediate curves or bends 7, in conjunction with the positioning of the extreme crimps 5I more closely adjacent to one another than the other crimps, results in a ring which is relatively easy to instal even when formed with a minimum number of crimps, as illustrated in the drawing, and which when installed exerts a uniform expansive action on the piston, free from inequalities in tension such as have hitherto resulted in inefficient scraping action and excessive localized wear.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. An inner expanding spring for use with a piston ring in a piston groove adapted to facilitate installation of the piston ring in the groove and to render uniform the wall tension exerted by the piston ring, comprising a thin split ribbon-like steel element having in relaxed condition a plurality of convex piston ring engaging crimps connected by curved convex reaches of greater radius of curvature than the crimps, whereby said reaches seat in the groove and minimize the extent to which the crimps project radially in the groove, the crimps immediately adjacent the split in the element being positioned more closely adjacent one another in installed position of the spring than any two other crimps in the element whereby to equalize the tension exerted on the piston ring by eliminating the drop in spring tension of the element normally occasioned by splitting the same.

2. An inner expanding spring for use with a piston ring in a piston groove adapted to facilitate installation of the piston ring in the groove and to render uniform the wall tension exerted by the piston ring, comprising a split spring element having in relaxed condition a plurality of convex crimps adapted for radial thrust engagement with the piston ring and connected by curved convex portions of greater radius of curvature than the crimps, a pair of said crimps being positioned closely adjacent the split in the element and more closely adjacent one another in installed position of the spring than any two other crimps in the spring whereby to equalize the tension exerted on the piston ring.

HAROLD P. PHILLIPS.